(12) United States Patent
Jeon

(10) Patent No.: US 8,305,546 B2
(45) Date of Patent: Nov. 6, 2012

(54) MOTHER SUBSTRATE FOR LIQUID CRYSTAL DISPLAY DEVICE AND METHOD OF FABRICATING LIQUID CRYSTAL DISPLAY DEVICE

(75) Inventor: Sang-Ky Jeon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1050 days.

(21) Appl. No.: 11/640,306

(22) Filed: Dec. 18, 2006

(65) Prior Publication Data

US 2007/0291214 A1    Dec. 20, 2007

(30) Foreign Application Priority Data

Jun. 19, 2006    (KR) .................. 10-2006-0054925

(51) Int. Cl.
*G02F 1/1345* (2006.01)
*G01R 31/26* (2006.01)

(52) U.S. Cl. ... 349/187; 349/149; 349/151; 324/760.01; 324/760.02

(58) Field of Classification Search .................. 349/149, 349/151, 187; 324/763, 770, 760.01, 760.02
See application file for complete search history.

(56) References Cited

U.S. PATENT DOCUMENTS

| | | | | |
|---|---|---|---|---|
| 5,585,647 A | * | 12/1996 | Nakajima et al. | 257/72 |
| 2003/0107698 A1 | * | 6/2003 | Nagayama et al. | 349/149 |
| 2005/0012518 A1 | * | 1/2005 | Lee | 324/770 |

* cited by examiner

*Primary Examiner* — Michael Caley
(74) *Attorney, Agent, or Firm* — Morgan, Lewis & Bockius LLP

(57) ABSTRACT

A method of fabricating a liquid crystal display device includes forming a gate driver and array elements in at least one cell area of a mother substrate while forming a test element in at least one test area of the mother substrate, and inspecting the test element to determine an operational state of the gate driver.

13 Claims, 4 Drawing Sheets

MOTHER SUBSTRATE FOR LIQUID CRYSTAL DISPLAY DEVICE AND METHOD OF FABRICATING LIQUID CRYSTAL DISPLAY DEVICE

This application claims the benefit of Korean Patent Application No. 2006-0054925, filed on Jun. 19, 2006, which is hereby incorporated by reference in its entirety.

BACKGROUND OF THE INVENTION

1. Field of the Invention

Embodiments of the invention relate to a display device, and more particularly to a mother substrate for a liquid crystal display (LCD) device and a method of fabricating a liquid crystal display device.

2. Discussion of the Related Art

Liquid crystal display (LCD) devices are widely used as monitors for notebook computers and desktop computers and televisions because of their high resolution, high contrast ratio, color rendering capability and superior performance in displaying moving images. An LCD device relies on the optical anisotropy and polarizing properties of liquid crystal to produce an image. An LCD device includes a liquid crystal panel including two substrates and a layer of liquid crystal molecules between the two substrates. An electric field generated between the two substrates controls an alignment direction of liquid crystal molecules to produce differences in transmittance. More specifically, the LCD device displays images by producing differences in transmittance of light from a backlight unit under the liquid crystal panel.

An active matrix type liquid crystal display (AM-LCD) device has a plurality of pixels that collectively display images. The pixels are arranged in matrix. Each of the pixels contains a thin film transistor used as a switching element.

FIG. 1 is a schematic block diagram of a liquid crystal display device according to the related art. As shown in FIG. 1, the liquid crystal display device includes a liquid crystal panel 10 and a driving circuit 20 for supplying signals to the liquid crystal panel 10. Although not shown in FIG. 1, the liquid crystal panel 10 includes first and second substrates and a layer of liquid crystal molecules between the first and second substrates. The first substrate, which is referred to as an array substrate, includes gate lines 12 and data lines 14 that cross each other to define a plurality of pixel regions "P" in a matrix. Within each one of the pixel regions "P," a thin film transistor (TFT) "T" is near each crossing of the gate lines 12 and the data lines 14 and connected to the gate lines 12 and the data lines 14. A pixel electrode is connected to the thin film transistor (TFT) "T" in each pixel region "P." In addition, the second substrate, which is referred to as a color filter substrate, includes a color filter layer (not shown) and a common electrode (not shown). The common electrode faces the pixel electrode across the layer of liquid crystal molecules (not shown). As a result, the common electrode, the pixel electrode and the layer of liquid crystal molecules constitute a liquid crystal capacitor "Clc" connected to the TFT "T".

A driving circuit 20 includes a timing controller 22, a gate driver 24 and a data driver 26. Although not shown in FIG. 1, the driving circuit 20 may further include an interface, a reference voltage generator and a source voltage generator. The interface transmits source signals from an external driving system (not shown), such as a personal computer, to the timing controller 22. The timing controller 22 generates gate control signals for the gate driver 24, and data control signals and data signals for the data driver 26. The gate driver 24 and the data driver 26 are attached to two adjacent sides of the liquid crystal panel 10 through a tape carrier package (TCP) to the gate lines 12 and the data lines 14, respectively. In response to the gate control signal, the gate driver 24 generates a gate signal that sequentially enables the plurality of gate lines 12 in each frame. The TFT "T" connected to each gate line 12 is turned on/off according to the gate signal. In addition, the data driver 26 selects a reference voltage in response to the data control signal and the data signal and supplies the reference voltage to the data lines 14.

When the TFT "T" is turned on in response to the gate signal of the gate driver 24, the data signal of the data driver 26 is transmitted to the pixel electrode through the TFT "T," and the liquid crystal molecules are driven by an electric field between the pixel electrode and the common electrode. The reference voltage generator generates reference voltages for a digital to analog converter (DAC) of the data driver 26, and the source voltage generates a source voltage for elements of the driving circuit 20 and a common voltage for the common electrode of the liquid crystal panel 10.

The TFT for an LCD device may be classified into an amorphous silicon TFT or a polycrystalline silicon TFT depending on the crystalline state of the semiconductor material. When an amorphous silicon TFT is used, the gate driver 24 and the data driver 26 are formed to be separated from the liquid crystal panel 10 and are attached to the liquid crystal panel 10 through a tape automated bonding (TAB) method so as to connected them to the gate lines 12 and the data lines 14, respectively.

A gate in panel (GIP) type LCD device has been researched and developed in which a either a portion of the gate driver or all of the gate driver is integrated into a liquid crystal panel using an amorphous silicon TFTs to reduce fabrication costs and simplify fabrication processes. In general, a gate driver includes a shift register unit and a level shifter unit. The shift register unit includes a plurality of flip-flops in which each is a bistable device that outputs a signal according to selection of set and reset signals. The level shifter unit amplifies a level of the output signal. In a GIP type LCD device, at least the shift register unit including a plurality of shift register stages is integrated onto a first substrate. The plurality of shift register stages correspond to a plurality of gate lines on the first substrate. Either a portion or the entire gate driver is integrated onto the first substrate so as to be concurrently fabricated while an array element is formed on the first substrate. As a result, additional fabrication cost and an additional fabrication process for the other portion of the gate driver or the entire gate driver are not required.

A GIP type LCD device has some disadvantages. The gate driver is only completed when the fabrication process for the first substrate is finished. Accordingly, the gate driver can not be inspected before the fabrication process for the LCD panel is finished, i.e., no midterm inspection of the gate driver exists. As a result, it is hard to inspect the properties of the gate driver, such as a normal operation of the plurality of shift register stages, reliability under a long time period operation and deterioration, before the LCD panel is fabricated.

The gate driver, including the plurality of shift register stages, can also be inspected after the fabrication process of the LCD panel, which includes a fabrication step of the first substrate having an array element, a fabrication step of the second substrate having a color filter layer and an attaching step of the first and second substrates with an interposed liquid crystal layer, is finished. However, since a process of removing laminated layers of the gate driver is required to expose the plurality of shift register stages, the inspected LCD panel can not be used as a product any more. Accordingly, fabrication cost increases and production yield decreases.

SUMMARY OF THE INVENTION

Accordingly, embodiments of the invention are directed to a mother substrate for a liquid crystal display device and a method of fabricating a liquid crystal display device that substantially obviate one or more of the problems due to limitations and disadvantages of the related art.

An object of embodiments of the invention is to provide a mother substrate for a liquid crystal display device and a method of fabricating a liquid crystal display device in which midterm inspection of a gate driver can be easily performed.

Another object of embodiments of the invention is to provide a mother substrate for a liquid crystal display device and a method of fabricating a liquid crystal display device in which fabrication cost is reduced and production yield is improved.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described, a method of fabricating a liquid crystal display device includes forming a gate driver and array elements in at least one cell area of a mother substrate while forming a test element in at least one test area of the mother substrate, and inspecting the test element to determine an operational state of the gate driver.

In another aspect, a method of fabricating a liquid crystal display device includes forming a gate driver, gate lines and shift register stages connected to the gate lines array elements in at least one cell area of a mother substrate while forming a test shift register stage in at least one test area of the mother substrate, and inspecting the test shift register stage to determine an operational state of the shift register stages.

In yet another aspect, a mother substrate for a liquid crystal display device includes at least one cell area having a gate driver and an array element, and at least one test area having a test element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
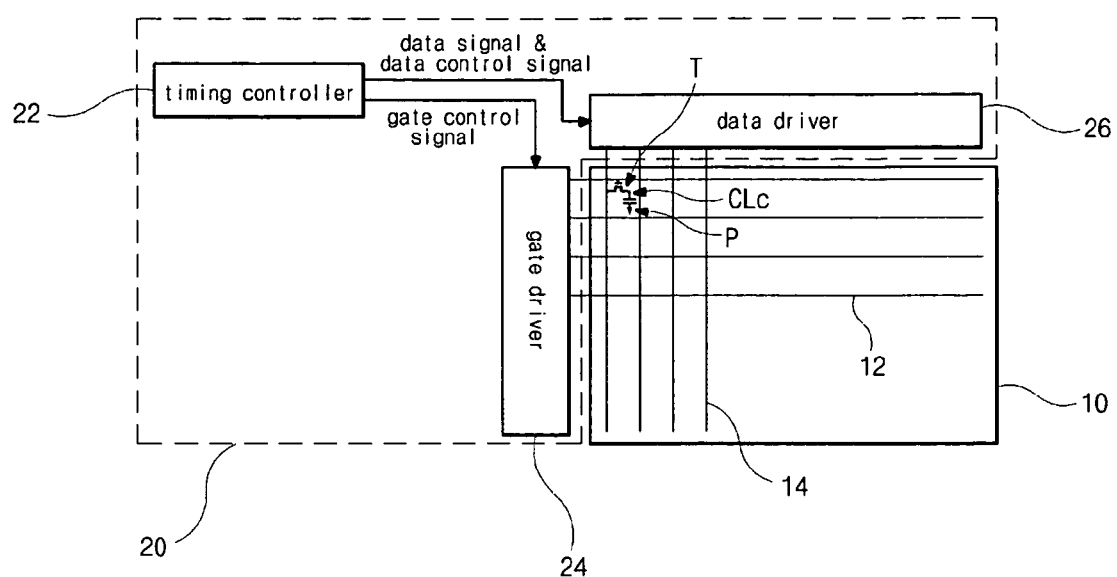
FIG. 1 is a schematic block diagram of a liquid crystal display device according to the related art.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 2:
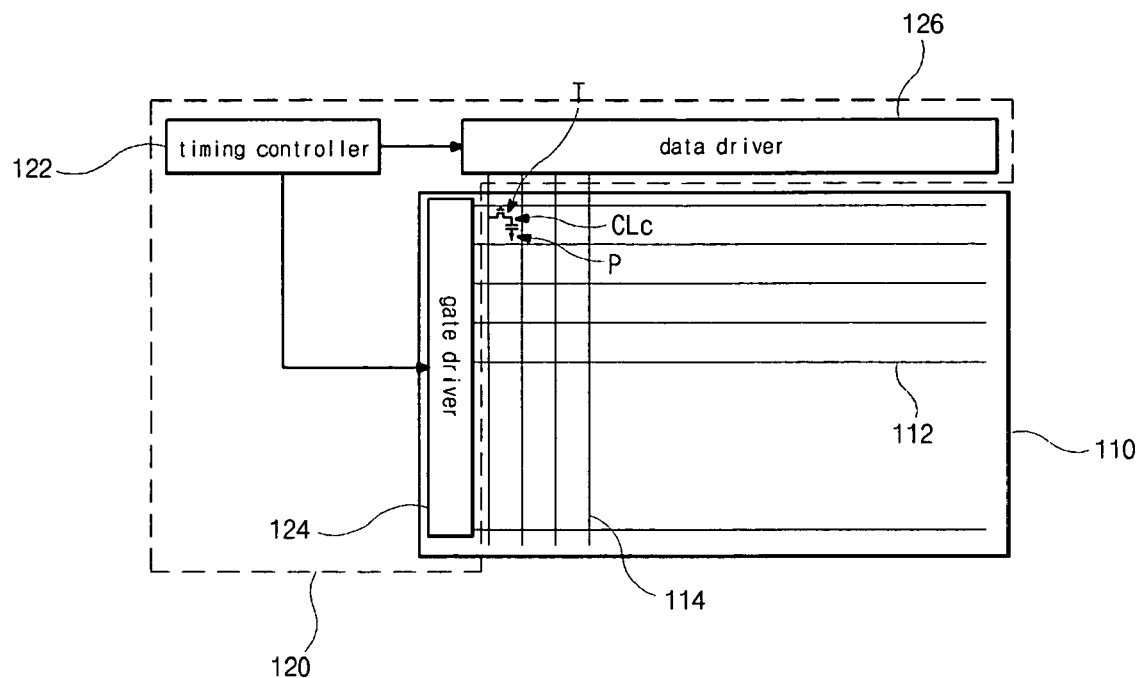
FIG. 2 is a schematic block diagram of a liquid crystal display device according to an embodiment of the invention.

FIG. 2 is a schematic block diagram of a liquid crystal display device according to an embodiment of the invention. As shown in FIG. 2, a liquid crystal display device includes a liquid crystal panel 110 and a driving circuit 120. Although not shown in FIG. 2, the liquid crystal panel 110 includes a first substrate, a second substrate and a layer of liquid crystal molecules between the first and second substrates. The first substrate, which is referred to as an array substrate, includes gate lines 112 and data lines 114 that cross each other to define a plurality of pixel regions "P" in matrix. Within each one of the pixel regions "P," a thin film transistor (TFT) "T" is near each crossing of the gate lines 112 and the data lines 114, and connected to the gate lines 112 and the data lines 114. A pixel electrode is connected to the thin film transistor (TFT) "T" in each pixel region "P." In addition, the second substrate, which is referred to as a color filter substrate, includes a color filter layer (not shown) and a common electrode (not shown). The common electrode faces the pixel electrode across the layer of liquid crystal molecules (not shown). As a result, the common electrode, the pixel electrode and the layer of liquid crystal molecules constitute a liquid crystal capacitor "Clc" connected to the TFT "T".

A driving circuit 120 includes a timing controller 122, a gate driver 124 and a data driver 126. Although not shown in FIG. 2, the driving circuit 120 may further include an interface, a reference voltage generator and a source voltage generator. The interface transmits source signals from an external driving system (not shown), such as a personal computer, to the timing controller 122. For example, the source signals may include a source image signal having information of brightness and control signals such as a vertical synchronous signal (Vsync), a horizontal synchronous signal (Hsync), a data enable signal (DE) and a data clock (DCLK). The vertical synchronous signal (Vsync) indicates start and end of a single frame image, and the horizontal synchronous signal (Hsync) indicates start and end of a single horizontal line image. In addition, the data enable signal (DE) indicates a valid section of a single horizontal line data and the data clock (DCLK) indicates a period of the valid section.

The timing controller 122 generates a gate control signal for the gate driver 124, and a data control signal and a data signal for the data driver 126 using the source signals. In response to the gate control signal, the gate driver 24 generates a gate signal that sequentially enables the gate lines 112 in each frame. In addition, the data driver 126 selects a reference voltage in response to the data control signal and the data signal, and supplies the reference voltage to the data lines 114. As a result, when the TFT "T" connected to the corresponding gate line 112 of a pixel region "P" is turned on according to the gate signal of the gate driver 124, the reference voltage corresponding to the data signal of the data driver 126 is transmitted to the pixel electrode through the TFT "T" of the pixel region "P." The layer of liquid crystal molecules corresponding to the pixel region "P" is driven by an electric field between the pixel electrode and the common electrode, thereby causing a transmittance difference for light passage through the pixel region "P."

The timing controller 122 outputs frame control signals including a gate shift clock (GSC), a gate output enable (GOE) signal and a gate start pulse (GSP) to the gate driver 124. The gate shift clock (GSC) indicates a time that the TFT "T" is turned on and the gate output enable (GOE) signal adjusts outputs of the gate driver 124. The gate start pulse (GSP) indicates a starting time of a frame. The timing controller 122 further outputs image control signals including a source sampling clock (SSC), a source output enable (SOE) signal, a source start pulse (SSP) and a polarization (POL) signal to the data driver 126. The source sampling clock (SSC) arranges and latches the data signal, and the source output enable (SOE) signal indicates a start time the latched data signal. The source start pulse (SSP) indicates a start time of a single horizontal data signal, and the polarization (POL) signal determines a polarity of the data signal. The polarization (POL) signal is synchronized with the source output enable (SOE) signal and the data signal alternately has one of a positive polarity (+) and a negative polarity (−) by the polarization (POL) signal.

The LCD device of FIG. 2 is a gate in panel (GIP) type in which a portion or the entire gate driver 124 is integrated into the liquid crystal panel 110 and the TFT "T" includes an active layer of amorphous silicon. Accordingly, at least a shift register unit of the gate driver 124 is formed on the first substrate simultaneously with array elements, such as the gate line 112, the data line 114 and the TFT "T." The first and second substrates for the LCD device may be obtained from first and second mother substrates, respectively. A plurality of first substrates each having an array element and a gate driver 124 are arranged in cell areas on the first mother substrate, and a plurality of second substrates each having a color filter layer and a common electrode are arranged in cell areas on the second mother substrate. The first and second mother substrates are attached to each other with a layer of liquid crystal molecules interposed therebetween, and then the attached first and second mother substrates are cut by cell areas to obtain a plurality of liquid crystal panels 110.

Figure 3:
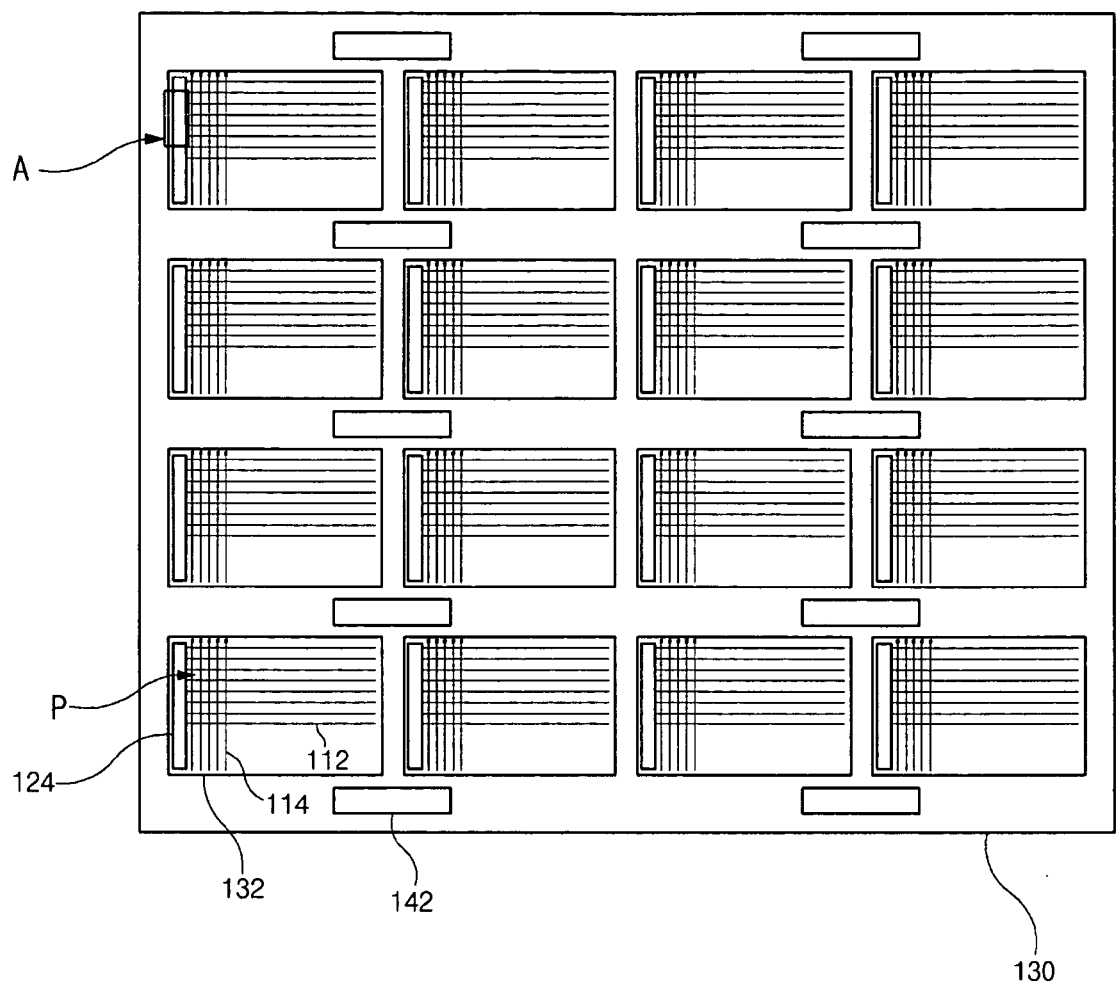
FIG. 3 is a schematic plan view showing a first mother substrate for a liquid crystal display device according to an embodiment of the invention.

FIG. 3 is a schematic plan view showing a first mother substrate for a liquid crystal display device according to an embodiment of the invention. As shown in FIG. 3, a first mother substrate 130 includes a plurality of cell areas 132 that each has a pixel region "P" defined by crossing gate lines 112 and data lines 114. Within each one of the pixel regions "P," a thin film transistor (TFT) "T" is near each crossing of the gate lines 112 and the data lines 114, and connected to the one of the gate lines 112 and the one of the data lines 114. A pixel electrode is connected to the thin film transistor (TFT) "T" in each pixel region "P."

Gate drivers 124 are integrated in one side of each of the cell areas 132. The gate lines 112 of each of the cell areas are connected to a corresponding one of the gate drivers 124. Each of the gate drivers 124 has a shift register unit, including a plurality of shift register stages connected to the gate lines 112. Further, the first mother substrate 130 includes test areas 142 where test elements are formed. The test elements include a test shift register stage in a test area corresponding to the plurality of shift register stages of the shift register unit for an adjacent gate driver. The test shift register stages in the test areas 142 and the plurality of shift register stages of the gate drivers 124 are formed concurrently with the gate lines 112, the data lines 114 and the TFTs. Thus, the test shift register stages of the test areas 142 have substantially the same circuit structure as each of the plurality of shift register stages in the shift register unit 125 of the gate drivers 124, since they are made the same way and at the same time.

Figure 4:
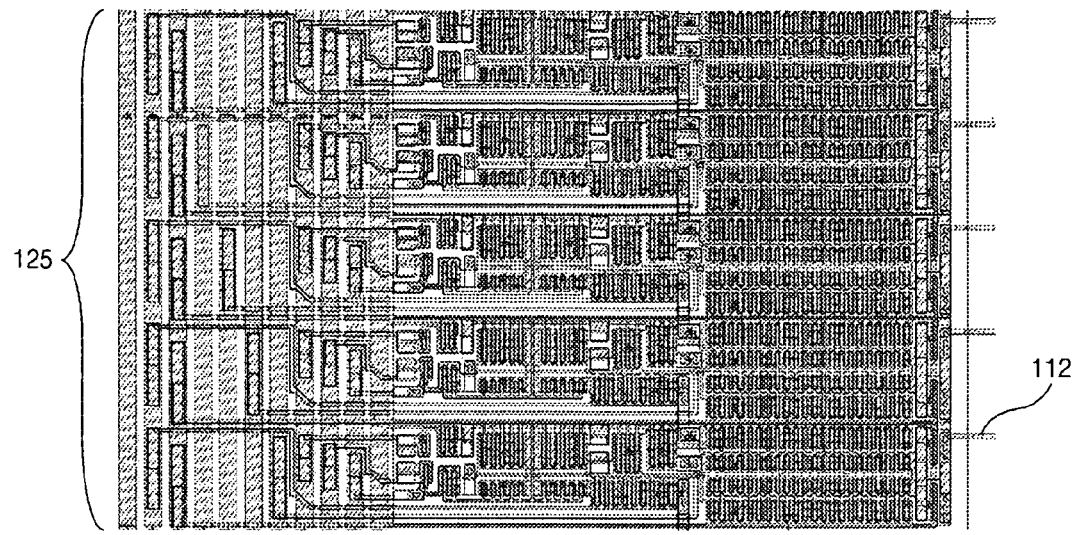
FIG. 4 is a schematic plan view showing a portion "A" of FIG. 3.
Figure 5:
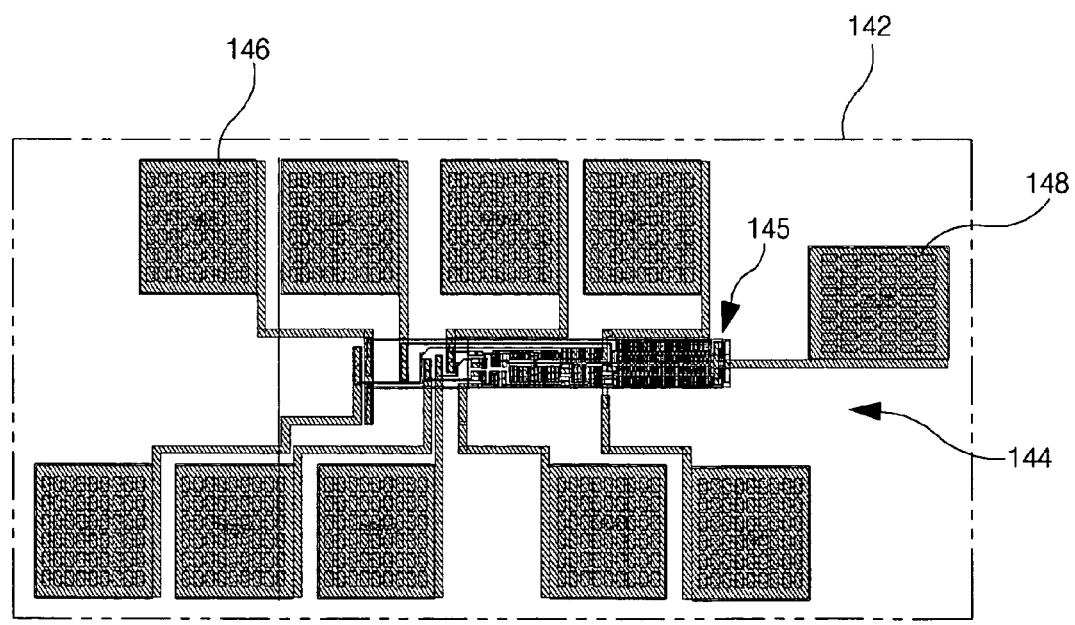
FIG. 5 is a schematic plan view showing a test area of FIG. 3.

FIG. 4 is a schematic plan view showing a portion "A" of FIG. 3, and FIG. 5 is a schematic plan view showing a test area of FIG. 3. As shown in FIGS. 4 and 5, the shift register unit 125, including the plurality of shift register stages 126 connected to gate lines 112, are formed at the same time as test elements 144, including a test shift register stages 145, which are formed in the test areas 142. The test elements 144 further include a plurality of input pads 146 and a plurality of output pads 148 connected to each of the test shift register stages 144. Although the test elements 144 in the test areas 142 are electrically separated from the gate lines 112, data lines 114, TFTs and the gate driver 124 in the cell areas 132, the test elements 144 are formed concurrently with the gate lines 112, data lines 114, TFTs and the gate driver 124 of each of the cell areas 132.

The test elements 144 are used for inspecting the shift register unit 125 of the gate drivers 124. After input signals for inspection are supplied to the plurality of input pads 146 of the test element 144 for a corresponding one of the cell areas 132, output signals from the plurality of output pads 148 are measured and analyzed to inspect the test shift register stage 145 for the corresponding one of the cell areas 132. Since the test shift register 145 is concurrently formed with the shift register unit 125 of the gate driver 124 through the same process, the result of inspection for the test element 144 may be used as a representative inspection result for the plurality of shift register stages 126 in the shift register unit 125. Since the test shift register stages 145 of the test elements 144 are concurrently formed with the plurality of shift register stages in the shift register unit 125 of a corresponding one of the gate drivers 124, normal or abnormal operation of a corresponding one of the gate drivers 124 may be verified by the inspection result of the test shift register 145. The input signals supplied to the plurality of input pads 146 may be the same as the gate signal applied to the gate drivers 124 for operation of the liquid crystal panel. For example, the test elements 144 may include nine input pads. As a result, the first mother substrate 130 includes test elements 144 in test areas 142 for each of the gate drivers 124 in the cell areas 132 so that representative midterm inspections for each of the gate drivers 124 can be performed.

The first mother substrate 130 may have non-uniformity in electrical properties of elements according to their position on the substrate due to localized anomalies in the fabrication process. Accordingly, the gate drivers 124 may also have a positional deviation even when all of the gate drivers 124 are formed through the same process. To increase reliability in inspection of the gate drivers 124, the test areas 142 for each of the gate drivers 124 are disposed at separated positions adjacent to the plurality of cell regions 132 of the gate drivers 124. As shown in FIG. 3, when 16 cell regions are disposed in 4 by 4 matrix on the first mother substrate 130, the test areas 142 may be disposed in 2 by 5 matrix such that each of the test areas 142 is disposed between the two adjacent cell regions 132. In the alternative, the test areas 142 may be disposed near each cell region 132 with a one-to-one disposition to each other in another embodiment. Each of the test areas 142 has the test shift register stage 145, the plurality of input pads 146 and a plurality of output pads 148. Since the test elements 144 are used for the midterm inspection and are electrically separated from the array elements and the gate driver 124 in the cell region 132, the test elements 144 can be disposed in area of the first mother substrate 130 that is subsequently removed by cutting after the attachment of the first and second mother substrates.

After the first mother substrate 130 is completed, the test element in the test area 142 may be probed for the midterm inspection of the gate driver 124. According to the result of the midterm inspection, the first mother substrate 130 may be judged to be good or bad, and performance of the subsequent process, such as attachment of the two mother substrates and injection of liquid crystal material is determined. The subsequent process may be not preformed for the bad first mother substrate 130 and may be performed for the good first mother substrate 130. In other words, the first mother substrate for attachment to the second mother substrate is selected by inspecting the test elements. Therefore, fabrication cost and production yield are improved.

The first mother substrate 130 passing the midterm inspection may be attached to the second mother substrate. The attached first and second mother substrates are then cut into a plurality of liquid crystal cells. Liquid crystal molecules are then injected into the plurality of liquid crystal cells to obtain the plurality of liquid crystal panels.

Consequently, in embodiments of the invention, a midterm inspection of the gate driver integrated in the liquid crystal panel is easily performed without a process of removing laminated layers of the gate driver. In addition, since the midterm inspection is performed for a test elements separated from the gate driver, the first mother substrate may be used for the liquid crystal panel even after the midterm inspection is completed. Accordingly, fabrication cost and production yield are improved. Further, the test element is disposed at an area of the first mother substrate that is subsequently removed during a cutting process when the liquid crystal panels are separated. Moreover, since the test element are formed concurrently with the gate driver and the array elements, such as the gate lines, data lines and TFTs, a simple and reliable inspection can be performed.

It will be apparent to those skilled in the art that various modifications and variations can be made in the mother substrate for a liquid crystal display device and a method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
   forming a gate driver and array elements in at least one cell area of a mother substrate while forming a test element in at least one test area of the mother substrate, wherein the test element is electrically separated from the gate driver and the array elements before the at least one test area is removed by a cutting process; and
   inspecting the test element to determine an operational state of the gate driver.

2. The method according to claim 1, wherein the forming the array elements includes:
   forming a gate line connected to the gate driver;
   forming a data line crossing the gate line to define a pixel region;
   forming a thin film transistor connected to the gate line and the data line and having an amorphous silicon layer; and
   forming a pixel electrode in the pixel region and connected to the thin film transistor.

3. The method according to claim 2, wherein the forming the gate driver includes forming a plurality of shift register stages connected to the gate lines.

4. The method according to claim 3, wherein the forming the test element includes forming a test shift register stage corresponding to the plurality of shift register stages.

5. The method according to claim 4, wherein the test element includes a plurality of input pads and a plurality of output pads connected to the test shift register stage.

6. The method according to claim 5, wherein the inspecting the test element includes:
   supplying input signals to the plurality of input pads;
   measuring output signals of the plurality of output pads; and
   analyzing the output signals.

7. The method according to claim 1, wherein a number of the at least one test area is equal to or less than a number of the at least one cell area, and the at least one test area is disposed outside of the at least one cell area.

8. The method according to claim 1, further comprising:
   forming a color filter layer and a common electrode on a second mother substrate;
   attaching the first and second mother substrates;
   forming a layer of liquid crystal molecules between the first and second mother substrates; and
   cutting the first and second mother substrates to obtain at least one liquid crystal panel.

9. The method according to claim 8, wherein the first mother substrate for attachment to the second mother substrate is selected by inspecting the test element.

10. A method of fabricating a liquid crystal display device, comprising:
    forming a gate driver, gate lines and shift register stages connected to the gate lines in at least one cell area of a mother substrate while forming a test shift register stage in at least one test area of the mother substrate, wherein the test shift register stage is electrically separated from the gate driver, the gate lines and the shift register stages before the at least one test area is removed by a cutting process; and
    inspecting the test shift register stage to determine an operational state of the shift register stages.

11. The method according to claim 10, further comprising a plurality of input pads and a plurality of output pads connected to the test shift register stage.

12. The method according to claim 10, further comprising:
    forming a color filter layer and a common electrode on a second mother substrate;
    attaching the first and second mother substrates;
    forming a layer of liquid crystal molecules between the first and second mother substrates; and
    cutting the first and second mother substrates to obtain at least one liquid crystal panel.

13. The method according to claim 12, wherein the first mother substrate for attachment to the second mother substrate is selected by inspecting the test element.

* * * * *